United States Patent
Nakayama

(10) Patent No.: US 9,027,617 B2
(45) Date of Patent: May 12, 2015

(54) PNEUMATIC TIRE

(75) Inventor: Souto Nakayama, Kodaira (JP)

(73) Assignee: Bridgestone Corporation, Tokyo (JP)

( * ) Notice: Subject to any disclaimer, the term of this patent is extended or adjusted under 35 U.S.C. 154(b) by 204 days.

(21) Appl. No.: 13/265,442

(22) PCT Filed: Apr. 22, 2010

(86) PCT No.: PCT/JP2010/002937
§ 371 (c)(1),
(2), (4) Date: Nov. 4, 2011

(87) PCT Pub. No.: WO2010/122804
PCT Pub. Date: Oct. 28, 2010

(65) Prior Publication Data
US 2012/0055604 A1 Mar. 8, 2012

(30) Foreign Application Priority Data

Apr. 22, 2009 (JP) ................................. 2009-104221

(51) Int. Cl.
*B60C 9/18* (2006.01)
*B60C 9/28* (2006.01)
*B60C 3/00* (2006.01)
*B60C 3/04* (2006.01)

(52) U.S. Cl.
CPC ........... *B60C 9/28* (2013.01); *Y10T 152/10765* (2015.01); *B60C 3/04* (2013.01)

(58) Field of Classification Search
None
See application file for complete search history.

(56) References Cited

U.S. PATENT DOCUMENTS

| 4,662,416 A * | 5/1987 | Yagi et al. ................. 152/209.14 |
| 2004/0238094 A1 | 12/2004 | Kajita |
| 2005/0006018 A1 | 1/2005 | Maruoka et al. |

FOREIGN PATENT DOCUMENTS

| EP | 2 233 320 A1 | 9/2010 |
| JP | 58-170602 A | 10/1983 |

(Continued)

OTHER PUBLICATIONS

Machine translation of JP 06156011, 1994.*
International Search Report of PCT/JP2010/002937 dated Jun. 15, 2010.

(Continued)

*Primary Examiner* — Justin Fischer
(74) *Attorney, Agent, or Firm* — Sughrue Mion, PLLC

(57) ABSTRACT

An object of the present invention is to provide a pneumatic tire of which rolling resistance is reduced without impairing wear resistance. Specifically, the pneumatic tire of the present invention comprises: a tread portion; a pair of side wall portions; a pair of bead portions; a carcass constituted of at least one carcass ply extending in a toroidal shape between bead cores in the respective bead portions; a belt disposed on the outer peripheral side of a crown region of the carcass and formed by at least one inclined belt layer made of cords extending to be inclined with respect to the equatorial plane of the tire; and a tread rubber disposed on the radially outer side of the belt, wherein a ratio of BD/BW satisfies the following formula: (0.062×tire aspect ratio−0.01)<BD/BW<(0.062× tire aspect ratio+0.004), provided that BD is a difference in radial distance measured from the rim diameter line between the maximum-radial distance position and a widthwise end edge position of the outermost layer of the inclined belt and BW is a width of the outermost inclined belt layer in a meridian cross section of the tire in a state where the tire is assembled with an application wheel rim.

5 Claims, 2 Drawing Sheets

(56) References Cited

FOREIGN PATENT DOCUMENTS

| JP | 6-1109 | * | 1/1994 |
| JP | 6-1109 A | | 1/1994 |
| JP | 06156011 | * | 6/1994 |
| JP | 2004-338454 A | | 12/2004 |
| JP | 2004-352174 A | | 12/2004 |
| JP | 2006-327502 A | | 12/2006 |
| JP | 2009-166819 A | | 7/2009 |

OTHER PUBLICATIONS

Chinese Office Action, dated Jun. 19, 2013, issued in corresponding Chinese Patent Application No. 201080022528.9.
Chinese Office Action, dated Oct. 22, 2013, issued in corresponding Chinese Patent Application No. 201080022528.9.
Extended European Search Report, dated Jul. 16, 2013, issued in corresponding European Patent Application No. 10766865.9.
Chinese Office Action dated May 4, 2014 issued in corresponding Chinese Patent Application No. 201080022528.9.

* cited by examiner

PNEUMATIC TIRE

CROSS REFERENCE TO RELATED APPLICATIONS

This application is a National Stage of International Application No. PCT/JP2010/002937 filed Apr. 22, 2010, claiming priority based on Japanese Patent Application No. 2009-104221filed Apr. 22, 2009, the contents of all of which are incorporated herein by reference in their entirety.

TECHNICAL FIELD

The present invention relates to a pneumatic tire, and more particularly, to a pneumatic tire achieving reduction of rolling resistance.

PRIOR ART

In recent years, there have been made variety of development approaches to address environment problems including global warming. An attempt to reduce fuel consumption of automobiles is an example of such approaches. Examples of a method of reducing fuel consumption include reduction of rolling resistance of tires, and various technical developments have been conventionally made in this regard.

It is known that major factors causing rolling resistance of a tire are crushed deformation of a tread in a ground-contact area, and the like. It is conventionally considered that, for example, replacing tread rubber for use in a tread with low-heat generating rubber having smaller loss tangent is effective in terms of reducing rolling resistance.

However, it is known that other functions of the tire such as wear resistance and control stability are sacrificed according to this method.

Alternatively, it is considered to reduce thickness of tread rubber in order to reduce the rolling resistance. However, in this case, sufficient wear resistance of a tire may not be ensured.

SUMMARY OF THE INVENTION

Problems to be solved by the Invention

As such, it is an object of the present invention to provide a pneumatic tire of which rolling resistance is reduced without impairing wear resistance.

Means for solving the Problems

The inventors of the present invention have found out as a result of a keen study of conventional tires that shear deformation in a tire circumferential direction due to deformation caused by driving of a tire significantly affects rolling resistance of the tire in a tread center region, while shear deformations in the tire widthwise direction before and after the tire contacting the ground during rotation thereof significantly affects rolling resistance in a shoulder region.

Further, the inventors found out that in a conventional tires: difference in radius between the tread center region and a shoulder region of a tire is relatively large in configuration thereof; and, since cords of belts in a tire reinforcement layer of the tire are composed of inclined belt layers crossing with one another, the shoulder region is bent in the radially outward direction when the tire is rotated under a load exerted thereon and thus the shoulder region is stretched in the tire circumferential direction due to the "pantograph" movement of the belts in the vicinity of the shoulder region, whereby the shoulder region shrinks in the tire widthwise direction, facilitating shear deformation of tread rubber in a cross section along a meridian line.

Accordingly, it is possible to reduce energy loss due to shear deformation and thus reduce rolling resistance by especially reducing shear deformation in the tire widthwise direction in a shoulder region.

In view of this, a pneumatic tire of the present invention comprises: a tread portion; a pair of side wall portions; a pair of bead portions; a carcass constituted of at least one carcass ply extending in a toroidal shape between bead cores in the respective bead portions; a belt disposed on the outer peripheral side of a crown region of the carcass and formed by at least one inclined belt layer made of cords extending to be inclined with respect to the equatorial plane of the tire; and a tread rubber disposed on the radially outer side of the belt, wherein a ratio of BD/BW satisfies the following formula: (0.062×tire aspect ratio−0.01)<BD/BW<(0.062×tire aspect ratio+0.004), provided that BD is a difference in radial distance measured from the rim diameter line between the maximum-radial distance position and a widthwise end edge position of the outermost layer of the inclined belt and BW is a width of the outermost inclined belt layer in a meridian cross section of the tire in a state where the tire is assembled with an application wheel rim.

In the present invention, an "applicable wheel rim" represents a wheel rim in conformity with an industrial standard valid in an area where the tires are manufactured and used. Examples of such industrial standards include JATMA (Japan Automobile Tire Manufacturers Association) YEAR BOOK in Japan, ETRTO (European Tire and Rim Technical Organization) STANDARDS MANUAL in Europe, and TRA (THE TIRE and RIM ASSOCIATION INC.) in the United States.

Further, in the present invention, a state where a "tire is assembled with an application wheel rim" represents a state where the tire is assembled with an application wheel rim prescribed in JATMA and either inflated at a very low internal pressure or at an internal pressure in the range of 0 to 30 kPa without a bulb core (i.e. the bulb core is to be removed form the tire in this case).

Yet further, a tire aspect ratio represents a ratio of a cross sectional height with respect to a cross sectional width of a tire in a state where the tire is assembled with an application wheel rim.

In such a tire as described above, a ratio of BW/SW preferably satisfies the following formula: (−1.04×tire aspect ratio+1.33)<BW/SW<(−1.04×tire aspect ratio+1.43), where BW is a width of the outermost inclined belt layer and SW is the maximum width of the tire in a meridian cross section of the tire.

Further, in such a tire as described above, a ratio of SWh/SH is preferably in the range of 0.5-0.8, where SH is a cross sectional height of the tire and SWh is a radial distance measured from the wheel rim line to a position where the tire width reaches the maximum value thereof.

Moreover, in such a tire as described above, a ratio of CWh/CH is preferably within the range of 0.5-0.9, where CH is a cross sectional full height of the carcass and CWh is a cross sectional partial height of the carcass up to a position where the carcass width reaches the maximum value thereof.

In the present invention, a "cross sectional height of a carcass" represents a radius of the outermost carcass ply layer

Effect of the Invention

In the pneumatic tire of the present invention, a ratio of BD/BW especially satisfies the following formula: (0.062× tire aspect ratio−0.01)<BD/BW<(0.062×tire aspect ratio+ 0.004), provided that BD is a difference in radial distance measured from the rim diameter line between the maximum-radial distance position and a widthwise end edge position of the outermost layer of the inclined belt and BW is a width of the outermost inclined belt layer in a meridian cross section of the tire in a state where the tire is assembled with an application wheel rim. As a result, the belts are flattened more, as compared with those of conventional tires, whereby, when a curved belt portion near a tread (near shoulder portions, in particular) is stretched and flattened overall within a ground contact area in a meridian cross section of the tire, an absolute stretch amount of the belt layer (s) in the tire circumferential direction in the vicinity of each of the shoulder regions is reduced due to relative small radial difference BD in the belt layers and therefore shear deformation of the tread in the tread widthwise direction occurring before and after load exertion on tread rubber can be effectively prevented. Consequently, it is possible to curb energy loss caused by deformation of the tread rubber and reduce rolling resistance caused by such deformation.

More specifically, in a case where BD/BW≤(0.062×tire aspect ratio−0.01), the tire may not be properly produced by molding. In a case where BD/BW≥(0.062×tire aspect ratio+ 0.004), desired rolling resistance may not be obtained in the resulting tire.

Further, in the present invention, the outermost belt layer is to be prevented from being completely flat in consideration of deformation components associated with deformation of the side portions of a tire, as well as a ground-contact configuration and a ground-contact pressure distribution in the tire required to suppress wear of the tire. In this regard, when BD/BW is set to be within the aforementioned preferable range, it is possible to make a crown region of the tread portion round and reduce "pantograph" movement of the belt, thereby making the ground-contact pressure distribution in a ground-contact area even and thus suppressing occurrence of wear of the tire.

DETAILED DESCRIPTION OF AN PREFERRED EMBODIMENT

An embodiment of a pneumatic tire according to the present invention will be described in detail with reference to the drawings.

Figure 1:
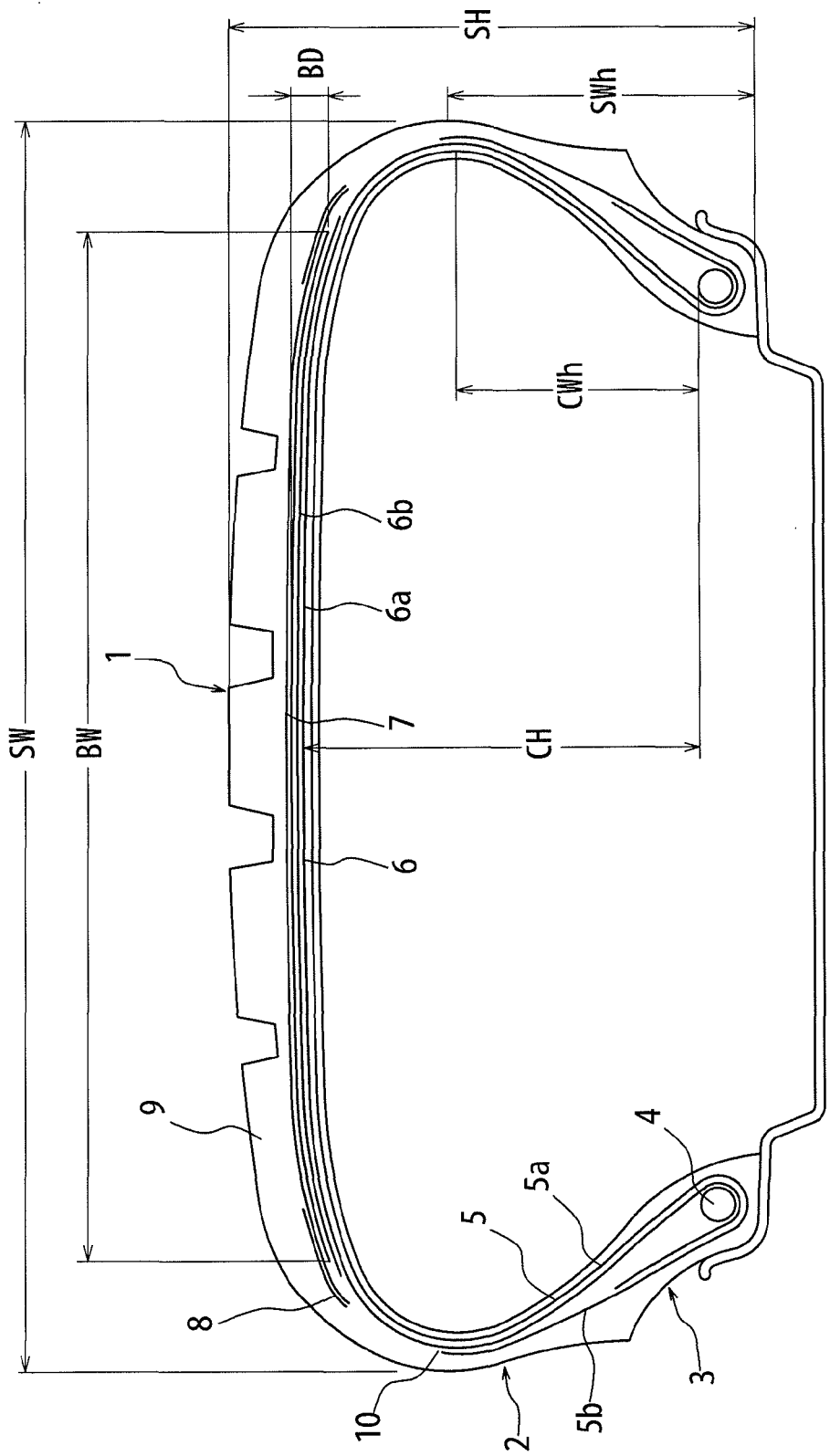
FIG. 1 is a tire meridian cross sectional view showing an embodiment of a pneumatic tire of the present invention in a state where the tire is assembled with an application wheel rim.

FIG. 1 is a meridian cross sectional view showing an embodiment of the pneumatic tire of the present invention in a state where the tire is assembled with an application wheel rim under no load exerted thereon. In FIG. 1, reference numbers 1, 2, 3 respectively represent a tread portion, a pair of side wall portions continuous with respective side sections of the tread portion 1 and extending in the radially inward direction, and bead portions continuous with the respective side walls 2 and extending in the radially inward direction.

The pneumatic tire shown in FIG. 1 has a carcass including two carcass plies 5, each of which being composed of: a main portion 5a extending in a toroidal shape across bead cores 4 which are embedded in the respective bead portions 3 and may have circular cross sections, respectively, and a pair of the bead portions 3; and fold-up portions 5b as respective side portions of the carcass ply 5, each folded up around the bead core 4 from the inner side toward the outer side in the tire widthwise direction such that heights in the radial direction of the respective fold-up portions 5b differ from each other.

In the present embodiment, the carcass ply 5 may be formed by, for example, a steel cord, an organic fiber cord or the like extending orthogonal to the tire circumferential direction.

Further, an innermost belt layer 6a and an outermost belt layer 6b made of cords inclined with respect to the tire circumferential direction, respectively, such that extension lengths of the respective belt layers in the tire widthwise direction differ from each other are disposed on the outer peripheral side of a crown region of the carcass (see FIG. 1). These two belt layers intersect each other, constituting a belt 6. Yet further, there are sequentially provided: a belt reinforcement layer 7 made of cords extending in the tire circumferential direction and disposed on the outer peripheral side of the belt 6; a belt end reinforcing layer 8 made of cords extending in the tire circumferential direction and disposed on the outer peripheral side of the belt reinforcing layer 7 at respective outer end portions thereof in the tire widthwise direction; and a tread rubber 9 disposed on the outer peripheral side of the belt end reinforcing layer 8. A plurality of grooves and the like extending in the tire circumferential direction are formed on a surface of the tread rubber 9.

At each side of the tire, an outer side in the tire widthwise direction of the carcass is covered by side rubber 10 disposed along the outer surface of the carcass.

Figure 2A:
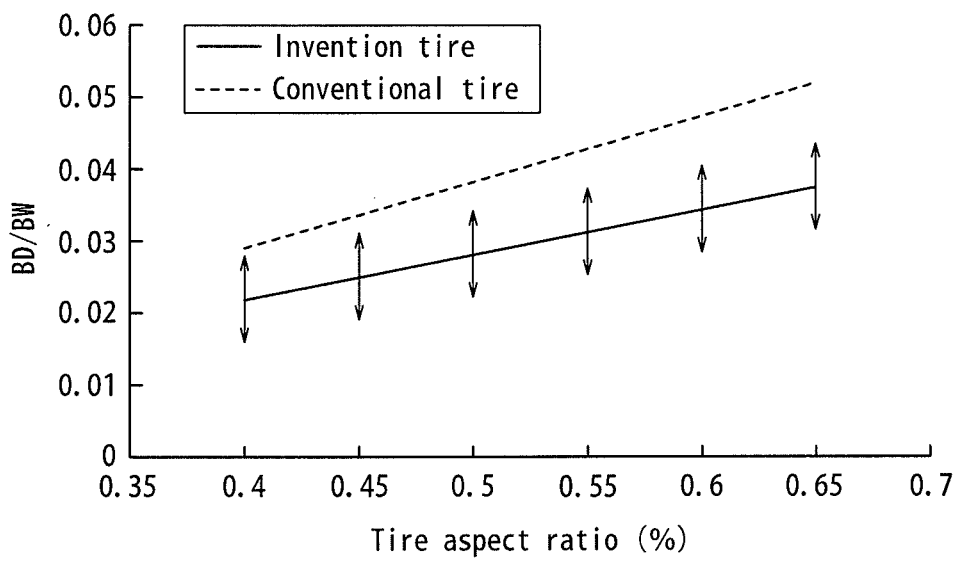
FIG. 2A is a diagram showing a relationship between tire aspect ratio and ratio BD/BW in tires according to the present invention and conventional tires.

In the pneumatic tire of the present invention, a ratio of BD/BW satisfies the following formula: (0.062×tire aspect ratio−0.01)<BD/BW<(0.062×tire aspect ratio+0.004), provided that BW is a width of the outermost belt layer 6b and that BD is a difference in radial distance measured from the rim diameter line between the maximum-radial distance position and a widthwise end edge position of the outermost belt layer 6b in a meridian cross section of the tire, as shown in a solid line in FIG. 2A. Setting the ratio BD/BW to be in the aforementioned range makes the belt 6 flatter and thus the tire maximum width SW larger than conventional tires.

Figure 2B:
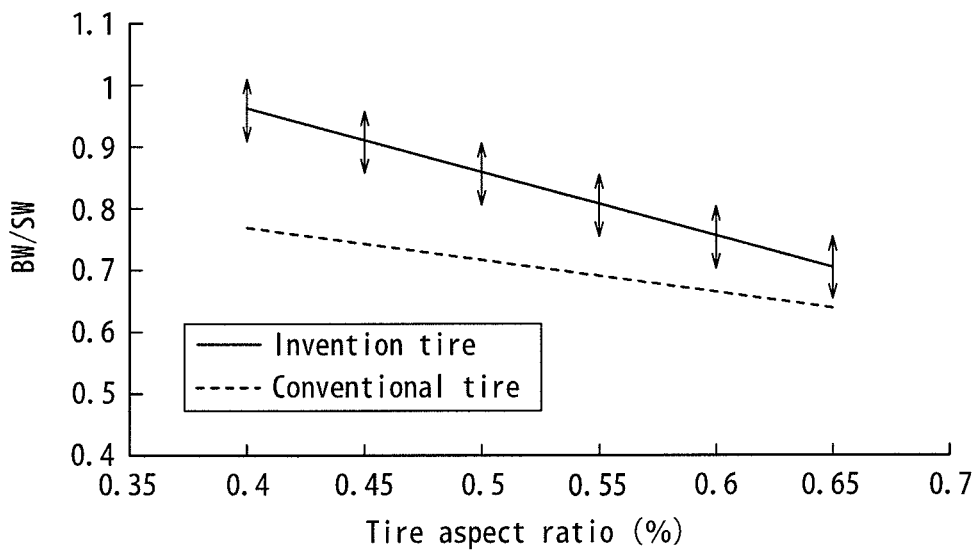
FIG. 2B is a diagram showing a relationship between tire aspect ratio and ratio BW/SW in tires according to the present invention and conventional tires.

In the pneumatic tire of the present invention, a ratio of BW/SW preferably satisfies the following formula: (−1.04× tire aspect ratio+1.33)<BW/SW<(−1.04×tire aspect ratio+ 1.43), provided that BW is a width of the outermost belt layer 6b and SW is the maximum tire width, as shown in a solid line in FIG. 2B.

Setting the ratio BW/SW to be in the aforementioned range increases the belt width BW, whereby wear resistance can be improved without sacrificing improvement in rolling resistance. As a result, rubber of the tread 1 can be made thinner, thereby further reducing the rolling resistance.

More specifically, in a case where the ratio of BW/SW≤ (0.062×tire aspect ratio−0.01), not only a ground-contact width of the tread is narrowed to deteriorate wear resistance of the tread but also a buttress portion where rubber thickness is relatively thin is positioned too near to the ground, resulting in lower resistance of the buttress portion to cutting by curb stones. In a case where the ratio of BW/SW≥(0.062×tire aspect ratio+0.004), tire weight is too heavy, possibly deteriorating rolling resistance.

It is also preferable that a ratio of SWh/SH is within a range of 0.5-0.8, where SH is a cross sectional height of the tire and SWh is a radial distance measured from the wheel rim line to a position where the tire width reaches the maximum value thereof.

As a result of setting the ratio of SWh/SH to be within the aforementioned range, the position where the tire width reaches the maximum value thereof approaches the crown region, whereby a tension in a circumferential direction in the belt 6 is increased and shear deformation of the tread 1 in the circumferential direction can be suppressed.

In a case where the ratio SWh/SH>0.8, the buttress portion located on the radially outer side of each sidewall portion 2 and having relatively thin rubber thickness is positioned too near to the ground, whereby, when a tire steps over a curb stone, a side portion of the carcass ply 5 hit by the curb stone may suffer from cutting or the like. In a case where the ratio SWh/SH<0.5, increase in tension in the circumferential direction of the belt 6 is not sufficient to suppress occurrence of shear deformation of the tread 1 in the circumferential direction, whereby rolling resistance may not be satisfactorily reduced.

Moreover, in such a tire as described above, a ratio of CWh/CH is preferably within the range of 0.55-0.9, where CH is a cross sectional full height of the carcass and CWh is a cross sectional partial height of the carcass up to a position where the carcass width reaches the maximum value thereof.

As a result of setting the ratio of CWh/CH to be within the aforementioned range, the position where the carcass width reaches the maximum value thereof approaches the crown region, whereby a tension in a circumferential direction in the belt 6 is increased and shear deformation of the tread 1 in the circumferential direction can be suppressed.

More specifically, in a case where the ratio CWh/CH>0.9, the buttress portion located on the radially outer side of each sidewall portion 2 and having relatively thin rubber thickness is positioned too near to the ground, whereby, when a tire steps over a curb stone, a side portion of the carcass ply 5 hit by the curb stone may suffer from cutting or the like. In a case where the ratio CWh/CH<0.55, increase in tension in the circumferential direction of the belt 6 is not sufficient to suppress occurrence of shear deformation of the tread 1 in the circumferential direction, whereby rolling resistance may not be satisfactorily reduced.

EXAMPLES

Next, a radial test tire having size 225/45R17 and a structure as shown in FIG. 1 was prepared. The radial tire includes: two carcass plies; two belt layers in which steel cords of one belt layer and steel cords of the other belt layer, inclined by ±28° with respect to the equatorial plane, respectively, intersect each other; and a circumferential belt reinforcing layer formed by spirally winding ribbon-shaped strip as a rubber-coated nylon cord on the belt layers. Specific characteristics of Example tires 1-9 and Comparative Example tires 1-3 are changed as shown in Table 1. Rolling resistance of the respective tires were measured.

The structures of Comp. Example tires other than those shown in Table 1 are the same as those of Example tires because these structures need not be changed.

TABLE 1

| | BW (mm) | BD (mm) | SW (mm) | SH (mm) | SWh (mm) | BD/BW | BW/SW | SWh/SH | CWh | CH | CWh/CH | Aspect ratio (SH/SW) | 0.062 × aspect ratio −0.01 | 0.062 × aspect ratio +0.004 |
|---|---|---|---|---|---|---|---|---|---|---|---|---|---|---|
| Example tire 1 | 172.5 | 3.5 | 230 | 97 | 43.7 | 0.020 | 0.75 | 0.45 | 41.7 | 84 | 0.50 | 0.4217391 | 0.016147826 | 0.030147826 |
| Example tire 2 | 172.5 | 4.3 | 230 | 97 | 43.7 | 0.025 | 0.75 | 0.45 | 41.7 | 84 | 0.50 | 0.4217391 | 0.016147826 | 0.030147826 |
| Example tire 3 | 172.5 | 5.2 | 230 | 97 | 43.7 | 0.030 | 0.75 | 0.45 | 41.7 | 84 | 0.50 | 0.4217391 | 0.016147826 | 0.030147826 |
| Example tire 4 | 200 | 5.0 | 230 | 97 | 43.7 | 0.025 | 0.87 | 0.45 | 41.7 | 84 | 0.50 | 0.4217391 | 0.016147826 | 0.030147826 |
| Example tire 5 | 207 | 5.2 | 230 | 97 | 43.7 | 0.025 | 0.90 | 0.45 | 41.7 | 84 | 0.50 | 0.4217391 | 0.016147826 | 0.030147826 |
| Example tire 6 | 218.5 | 5.5 | 230 | 97 | 43.7 | 0.025 | 0.95 | 0.45 | 41.7 | 84 | 0.50 | 0.4217391 | 0.016147826 | 0.030147826 |
| Example tire 7 | 207 | 5.2 | 230 | 97 | 48.5 | 0.025 | 0.90 | 0.50 | 46.5 | 84 | 0.55 | 0.4217391 | 0.016147826 | 0.030147826 |
| Example tire 8 | 207 | 5.2 | 230 | 97 | 58.2 | 0.025 | 0.90 | 0.60 | 56.2 | 84 | 0.67 | 0.4217391 | 0.016147826 | 0.030147826 |
| Example tire 9 | 207 | 5.2 | 230 | 97 | 77.6 | 0.025 | 0.90 | 0.80 | 75.6 | 84 | 0.90 | 0.4217391 | 0.016147826 | 0.030147826 |
| Comp. Ex. 1 | 168.5 | 5.6 | 225 | 97 | 43.7 | 0.033 | 0.75 | 0.45 | 41.7 | 84 | 0.50 | 0.4311111 | 0.016728889 | 0.030728889 |
| Comp. Ex. 2 | 165 | 5.4 | 220 | 97 | 43.7 | 0.033 | 0.75 | 0.45 | 41.7 | 84 | 0.50 | 0.4409091 | 0.017336364 | 0.031336364 |
| Comp. Ex. 3 | 168.5 | 0.8 | 225 | 97 | 43.7 | 0.005 | 0.75 | 0.45 | 41.7 | 84 | 0.50 | 0.4311111 | 0.016728889 | 0.030728889 |

Rolling Resistance

Each of Example tires 1-9 and Comp. Example tires 1-3 was assembled with a rim of 7.5JJ×17 in conformity with JATMA and inflated at an internal pressure of 230 kPa under load of 3.92 kN. The tire was then rotated at a speed of 80 km/h and rolling resistance was measured by using a drum testing machine having an iron plate surface of 1.7 m diameter. The results are shown by indices in Table 2.

In Table 2, the indices are values relative to the corresponding values of Comp. Example tire 1 and the smaller indices represent the better rolling resistance properties.

Wear Resistance

Each of Example tires 1-9 and Comp. Example tires 1-3 was assembled with a rim of 7.5JJ×17 in conformity with JATMA and inflated at an internal pressure of 230 kPa under load of 3.92 kN. The tire was then rotated at a speed of 80 km/h and the total wear amount of the entire ground-contact area after the tire was rotated through a running distance of 2000 km was measured by using a drum testing machine having an iron plate surface of 3 m diameter. The results are shown by indices in Table 2.

In Table 2, the indices are values relative to the corresponding values of Comp. Example tire 1 and the smaller indices represent the better wear resistance properties.

TABLE 2

|  | Rolling Resistance | Wear Resistance |
| --- | --- | --- |
| Example Tire 1 | 95 | 99 |
| Example Tire 2 | 93 | 97 |
| Example Tire 3 | 96 | 98 |
| Example Tire 4 | 93 | 91 |
| Example Tire 5 | 92 | 89 |
| Example Tire 6 | 94 | 88 |
| Example Tire 7 | 89 | 89 |
| Example Tire 8 | 87 | 87 |
| Example Tire 9 | 84 | 87 |
| Comp. Example Tire 1 | 100 | 100 |
| Comp. Example Tire 2 | 105 | 103 |
| Comp. Example Tire 3 | 97 | 108 |

It is understood from the results in Table 2 that: rolling resistance is reduced in Example tires 1-3, as compared with Comp. Example 1, by making belts flat by setting BD/BW to be in the range of 0.02 to 0.03; wear resistance is improved without significantly changing rolling resistance in Examples 4-6, as compared with Example 2, by increasing a belt width by setting BW/SW to be in the range of 0.87 to 0.95; and rolling resistance properties and wear resistance are improved in Examples 7-9, as compared with Example 5, by shifting the tire maximum width position toward the crown region by setting SWh/SH to be in the range of 0.5 to 0.8. In contrast, rolling resistance deteriorates in Comp. Example 2 due to too small SW. In Comp. Example 3 having too flat belt configuration, wear resistance deteriorates although rolling resistance is reduced.

EXPLANATION OF REFERENCE NUMERALS

1 Tread portion
2 Sidewall portion
3 Bead portion
4 Bead core
5 Carcass
5a Carcass main portion
5b Carcass fold-up portion
6 Belt
6a Innermost belt layer
6b Outermost belt layer
7 Belt reinforcement layer
8 Belt end reinforcing layer
9 Tread rubber
10 Side rubber

The invention claimed is:
1. A pneumatic tire of the present invention comprising:
a tread portion;
a pair of side wall portions;
a pair of bead portions;
a carcass constituted of at least one carcass ply extending in a toroidal shape between bead cores in the respective bead portions;
a belt disposed on the outer peripheral side of a crown region of the carcass and formed by at least one inclined belt layer made of cords extending to be inclined with respect to the equatorial plane of the tire; and
a tread rubber disposed on the radially outer side of the belt,
wherein a ratio of BD/BW satisfies the following formula: (0.062×tire aspect ratio−0.01)<BD/BW<(0.062×tire aspect ratio+0.004), provided that BD is a difference in radial distance measured from the rim diameter line between the maximum-radial distance position and a widthwise end edge position of the outermost layer of the inclined belt and BW is a width of the outermost inclined belt layer in a meridian cross section of the tire in a state where the tire is assembled with an application wheel rim,
wherein a ratio of SWh/SH is in the range of 0.75 to 0.80, where SH is a cross sectional height of the tire and SWh is a radial distance measured from a wheel rim line to a position where a tire width reaches the maximum value thereof,
wherein a ratio of BW/SW satisfies the following formula: (−1.04×tire aspect ratio+1.33)<BW/SW<(−1.04×tire aspect ratio+1.43), where BW is the width of the outermost inclined belt layer and SW is a maximum width of the tire in the meridian cross section of the tire, and the tire aspect ratio is equal to or less than 0.55.

2. The pneumatic tire of claim 1, wherein a ratio of CWh/CH is within the range of 0.55-0.9, where CH is a cross sectional full height of the carcass and CWh is a cross sectional partial height of the carcass up to a position where the carcass width reaches the maximum value thereof.

3. The pneumatic tire of claim 1, wherein a ratio of CWh/CH is within the range of 0.7-0.9. where CH is a cross sectional full height of the carcass and CWh is a cross sectional partial height of the carcass up to a position where the carcass width reaches the maximum value thereof.

4. A pneumatic tire of the present invention comprising:
a tread portion;
a pair of side wall portions;
a pair of bead portions;
a carcass constituted of at least one carcass ply extending in a toroidal shape between bead cores in the respective bead portions;
a belt disposed on the outer peripheral side of a crown region of the carcass and formed by at least one inclined belt layer made of cords extending to be inclined with respect to the equatorial plane of the tire; and
a tread rubber disposed on the radially outer side of the belt,
wherein a ratio of BD/BW satisfies the following formula: (0.062×tire aspect ratio−0.01)<BD/BW<(0,062×tire aspect ratio+0.004), provided that BD is a difference in radial distance measured from the rim diameter line between the maximum-radial distance position and a widthwise end edge position of the outermost layer of the inclined belt and BW is a width of the outermost inclined belt layer in a meridian cross section of the tire in a state where the tire is assembled with an application wheel rim,
a ratio of CWh/CH is within the range of 0.55-0.9, where CH is a cross sectional full height of the carcass measured from a radially outermost circumferential portion of the bead core and CWh is a cross sectional partial height of the carcass up to a position where the carcass width reaches the maximum value thereof measured from a radially outermost circumferential portion of the bead core, and
wherein a ratio of SWh/SH is in the range of 0.75 to 0.80, where SH is a cross sectional height of the tire and SWh is a radial distance measured from a wheel rim line to a position where a tire width reaches the maximum value thereof, wherein a ratio of BW/SW satisfies the following formula: $(-1.04 \times \text{tire aspect ratio} + 1.33) < BW/SW < (-1.04 \times \text{tire aspect ratio} + 1.43)$, where BW is the width of the outermost inclined belt layer and SW is a maximum width of the tire in the meridian cross section of the tire, and the tire aspect ratio is equal to or less than 0.55.

5. The pneumatic tire of claim 4, wherein a ratio of CWh/CH is within the range of 0.7-0.9. where CH is a cross sectional full height of the carcass and CWh is a cross sectional partial height of the carcass up to a position where the carcass width reaches the maximum value thereof.

\* \* \* \* \*